United States Patent [19]

Knight

[11] Patent Number: 4,995,010

[45] Date of Patent: Feb. 19, 1991

[54] DEPTH FINDING-TROLLING SYSTEM

[75] Inventor: Steven J. Knight, Mapleton, Minn.

[73] Assignee: Johnson Fishing, Inc., Mankato, Minn.

[21] Appl. No.: 383,835

[22] Filed: Jul. 21, 1989

[51] Int. Cl.$^5$ .............................................. G01S 15/08
[52] U.S. Cl. ...................................... 367/111; 367/173
[58] Field of Search ............... 367/111, 107, 108, 173;
340/722; 73/290 V; 364/516

[56] References Cited

U.S. PATENT DOCUMENTS

| | | | |
|---|---|---|---|
| 2,837,727 | 6/1958 | Mayes | 367/173 |
| 3,564,490 | 2/1971 | Camp | 367/910 |
| 3,588,795 | 6/1971 | Linardos et al. | 367/108 |
| 3,729,162 | 4/1973 | Salvato | 367/173 |
| 3,740,706 | 6/1973 | Joseph | 367/173 |
| 3,752,431 | 8/1973 | McBride | 367/173 |
| 3,880,106 | 4/1975 | Farmer | 367/165 |
| 4,122,429 | 10/1978 | Hatai | 367/108 |
| 4,152,690 | 5/1979 | Veatch | 367/173 |
| 4,281,404 | 7/1981 | Morrow, Jr. et al. | 367/108 |
| 4,282,590 | 8/1981 | Wingate | 367/173 |
| 4,339,811 | 7/1982 | Bednarz et al. | 367/108 |
| 4,737,940 | 4/1988 | Arrington | 367/173 |
| 4,784,624 | 11/1988 | Yoshida | 440/113 |
| 4,829,493 | 5/1989 | Bailey | 367/111 |

*Primary Examiner*—Thomas H. Tarcza
*Assistant Examiner*—Daniel T. Pihulic
*Attorney, Agent, or Firm*—Foley & Lardner

[57] ABSTRACT

A depth finding-trolling system for measuring the water depth and operating a trolling motor. The depth finder and trolling motor are configured within a unitary structure having dimensions of a conventional trolling motor. The depth finder includes an automatic gain circuit and a display including one or more arrays of information operatives representing depth measurement.

9 Claims, 8 Drawing Sheets

DEPTH FINDING-TROLLING SYSTEM

TECHNICAL FIELD

This invention relates, generally, to depth finders of the type used to measure water depth and to detect the presence of fish and other submerged objects, and to electric trolling motors used as a source of power in boats, in particular, to a dual function system for trolling and depth finding wherein the depth finder and trolling motor are configured within a unitary structure having dimensions of a conventional trolling motor.

BACKGROUND OF THE INVENTION

Use of electronic sonar systems in boats by fisherman and other boatsmen has become very popular. Such systems are used to measure the depth of the water and/or to recognize the presence of fish or other objects beneath the boat.

Sonar systems involve the propagation and detection of acoustic or sound waves in water. Of all the forms of radiation, sound travels best through water. Both light and radio waves are attenuated to far greater extent than is sound, particularly in turbid water. Because of the relative ease of propagation of sound waves, underwater sound can be readily applied to depth sounding of a body of water.

Typically, sound waves are developed electronically as a single short pulse. This output wave or signal is conveniently generated by an electric circuit oscillator. The resultant electrical energy is converted into acoustic energy by a transducer and is sent out into the water in a cone-like fashion. The signal travels through the water to a target, for example, the bottom of a lake, and some portion of the energy reaching the target is reflected or reradiated back to the source as a sonic echo. Upon return, this echo acoustic signal present in the water is reconverted to an electrical signal, usually including electronic amplification. The speed of sound in water is about 4,950 feet per second and, by carefully timing how long it takes for the echo to return, it is possible to determine the distance between the target and the source.

Most relatively low cost electronic depth finders that are used today by fishermen employ a main battery-operated control box located in the boat and housing an electronic device that creates an electrical signal which travels from the control box through an electrical cable to a transducer device that is placed in the water. Usually a single transducer is used for both transmission and reception. The amplified electrical echo signals are processed in various ways and finally applied to a monitor or display device and may be displayed in a variety of readout modes. The control box may include a volume sensitivity or gain control so that the sound signal may be adjusted loud enough to bounce back an echo even if the water is very deep or the body of water has a soft mud bottom which tends to absorb sound.

Despite numerous prior art attempts to devise convenient depth finding devices for fishermen, these devices have several common drawbacks. Most depth finders are multi-unit, cumbersome devices in which the transducer, display indicator and associated electronics are separate units.

Some prior art sonar units, for example, place the transducer over the side of the boat, attached to a wire or cable. See, for example, U.S. Pat. No. 4,339,811, issued July 13, 1982 to Bednarz et al; U.S. Pat. No. 3,588,795, issued June 28, 1971 to Linardos et al; U.S. Pat. No. 4,122,429, issued Oct. 24, 1978 to Hatai; U.S. Pat. No. 3,564,490, issued Feb. 16, 1971 to Camp. Transducers, so arranged, lack stability and the depth finders are somewhat unreliable in their operation.

In other depth finders, the transducer requires a special mount or bracket. For example, U.S. Pat. No. 3,740,706, issued June 19, 1973 to Joseph, and U.S. Pat. No. 3,752,431, issued Aug. 14, 1973 to McBride, disclose transom mount apparatuses for a transducer. See also, U.S. Pat. No. 3,729,162 issued Apr. 24, 1973 to; U.S. Pat. No. 2,837,727 issued June 3, 1958 to Mayes; U.S. Pat. No. 4,282,590 issued Aug. 4, 1981 to Wingate.

In some prior art depth finder devices, the transducer is connected or mounted in some manner to a trolling motor. Fishing boats often utilize small electric motors which may be bow mounted or transom mounted as a secondary source of power for trolling or positioning. For example, U.S. Pat. No. 3,880,106, issued Apr. 29, 1975 to Farmer, discloses a transducer mounted on the front of a trolling motor casing. U.S. Pat. No. 4,152,690, issued May 1, 1979 to Veatch, teaches a transducer mounted on the shaft of a trolling motor. U.S. Pat. No. 4,737,940, issued Apr. 12, 1988 to Arrington, discloses a transducer mounted within the front bearing cap of a trolling motor. In all these devices, the electronics and depth display are separate units from the transducer and/or trolling motor. Moreover, the depth finder and trolling motor must be operated separately. Thus, the fisherman cannot conveniently and simultaneously troll and depth sound.

The display methods used for coupling a sonar system to the observer are no less important than those used in coupling it to the body of water. The form in which the response of the system is presented for observation determines to a considerable extent the facility with which the information obtained may be utilized. Much can be done by proper choice of the indicating or recording instrument to enhance any characteristics of the signal.

In most prior art devices, the display instrumentation is usually housed in a separate unit connected to the transducer by cable. The display indicators are often difficult to read under many environmental conditions and from locations in the boat remote from the display.

Several kinds of data displays indicating water depths are known. These include a simple meter unit which employs a needle in combination with a dial, a graphic recorder which actually prints out a two-dimensional plot of the bottom showing slopes and drop-offs, a digital read-out which displays numerical values of the depths, or a video display which may be a direct read-out of depths or a graphic representation.

Digital read-outs have become particularly popular since they are readily associated with solid state circuitry. Prior art devices which utilize digital read-out displays include those disclosed, for example, in U.S. Pat. No. 3,588,795, issued June 28, 1971 to Linardos et al and U.S. Pat. No. 4,281,404, issued July 28, 1981 to Morrow et al; U.S. Pat. No. 4,122,429, issued Oct. 24, 1978 to Hatai; U.S. Pat. No. 4,339,811, issued July 13, 1982 to Bednarz et al. Digital read-out displays, however, lack the visual vertical and horizontal displacement information of a graphic recorder.

A single unit depth finder/display indicator has been disclosed in U.S. Pat. No. 4,281,404, issued July 28, 1981 to Morrow et al. This patent teaches a hand held, selfcontained depth finding device which is gun-shaped, wherein the transducer and read-out display in the form of a liquid crystal are housed in a single case. One end of the barrel-shaped portion of the device houses the transducer and is immersible in water; the liquid crystal display is housed at the opposite end of the barrel. While such a unit has the advantages of size and compactness, the device has the disadvantages of having to be held in the fisherman's hand partially immersed in the water, and triggered for operation. It is also cumbersome if the fisherman is attempting to operate the trolling motor at the same time.

Despite recognition of the many practical design problems for convenient depth sounding, especially in combination with trolling, proper solution to all these problems in a single device has not been demonstrated in the prior art. None of the prior art devices provides features of single unit construction of the depth finder and the trolling motor which allows simple and convenient simultaneous operation of both devices, single unit construction of depth finder and display instrumentation, or displays of depth information which are both easily readable at a distance and give a pictorial representation of the depth.

SUMMARY OF THE INVENTION

The present invention provides a system for measuring water depth and operating a boat trolling motor, which comprises a depth finder and trolling motor being disposed within a single unit characterized by dimensions and configuration similar to a conventional trolling motor.

The system, in accordance with the present invention, includes a sonic transducer for transmitting and receiving sonic signals disposed within a motor housing of a trolling motor, a main electronic circuit connected to the transducer for electrically developing a transmitted sonic signal and processing a received sonic echo signal into a signal corresponding to a depth distance, a depth display board circuit operatively associated with the main circuit for translating the depth distance signal into visual information operatively housed within the control box of the trolling motor, and a display including one or more arrays of information operatives representing depth measurement.

According to one aspect of the invention, the system may include a gain control circuit which automatically amplifies the echo signal.

The depth finder display in accordance with a preferred embodiment of this invention includes one or more arrays of indicator portions having vertical and horizontal displacement of information operatives which allows a graphic representation of depth. The indicator portions utilize bright, high intensity light-emitting diodes (LEDs) which allow easy reading in direct sunlight or other adverse ambient light conditions. An advantage of the present invention is that it translates the numerical depth distances values into a display that can be conveniently seen and interpreted from nearly any position in the boat and which quickly informs the fisherman of the pertinent information.

The depth finder in a preferred embodiment of the present invention has a depth measurement range of about 0 to 40 feet and may be optionally operated when the trolling motor is turned off. The depth finder advantageously has minimum power requirements, drawing only about 0.1 amps, and can battery with very little effect on the battery charge.

Additionally, the transducer requires no separate installation. Other advantages and a fuller appreciation of the specific physical and electrical attributes of this invention will be gained upon an examination of the following detailed description of preferred embodiments, taken in conjunction with the figures of the drawing.

BRIEF DESCRIPTION OF THE DRAWING

The preferred exemplary embodiment of the present invention will hereinafter be described in conjunction with the appended drawing wherein like designations refer to like elements throughout and in which.

DETAILED DESCRIPTION OF THE PREFERRED EMBODIMENTS

The system, in accordance with the present invention, comprises a depth finder and an electric trolling motor disposed within a unitary structure characterized by dimension and configuration similar to a conventional trolling motor. The system may be either transom or bow mounted in a boat. The trolling and depth finding functions may be operated together or individually, as desired.

The unitary structure includes a generally cylindrical, horizontally elongated front-to-rear extending housing, submersible in water, within which an electric motor and a sonic transducer are disposed. A support means is provided which connects the housing to a control box which houses the electronic circuit boards for the depth finder and display assembly A tiller or handle which incorporates a motor on/off and forward/reverse switch is attached to the control box. An on/off switch for the depth finder is also coupled to the control box.

Electric propulsion motors of the general type used in accordance with the present invention are well known to persons skilled in the art. Motors which may be suitably used in accordance with the present invention have a thrust of between about 8 to 41 lbs., preferably about 17 lb., an ampere draw of about 7 to 28 amps, preferably about 25 amps, two to five forward speeds and one to two reverse speeds or may have completely variable speeds. A detailed description of the structure as well as the physical and electrical operation of such motors is not deemed necessary except as regards the combining of a depth finder function with the trolling motor function in a unitary structure.

Figure 1:
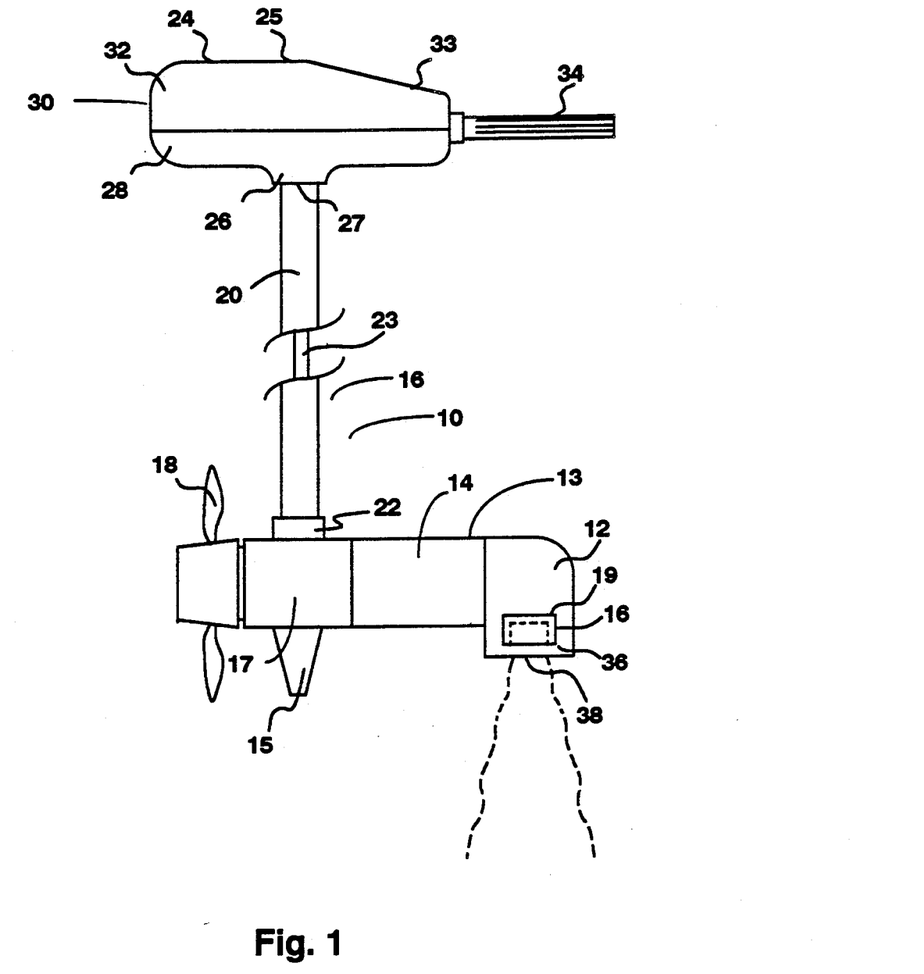
FIG. 1 is a side view of the assembled depth finder-trolling motor with a broken away section to illustrate the positioning of the transducer all in accordance with the present invention.
Figure 2:
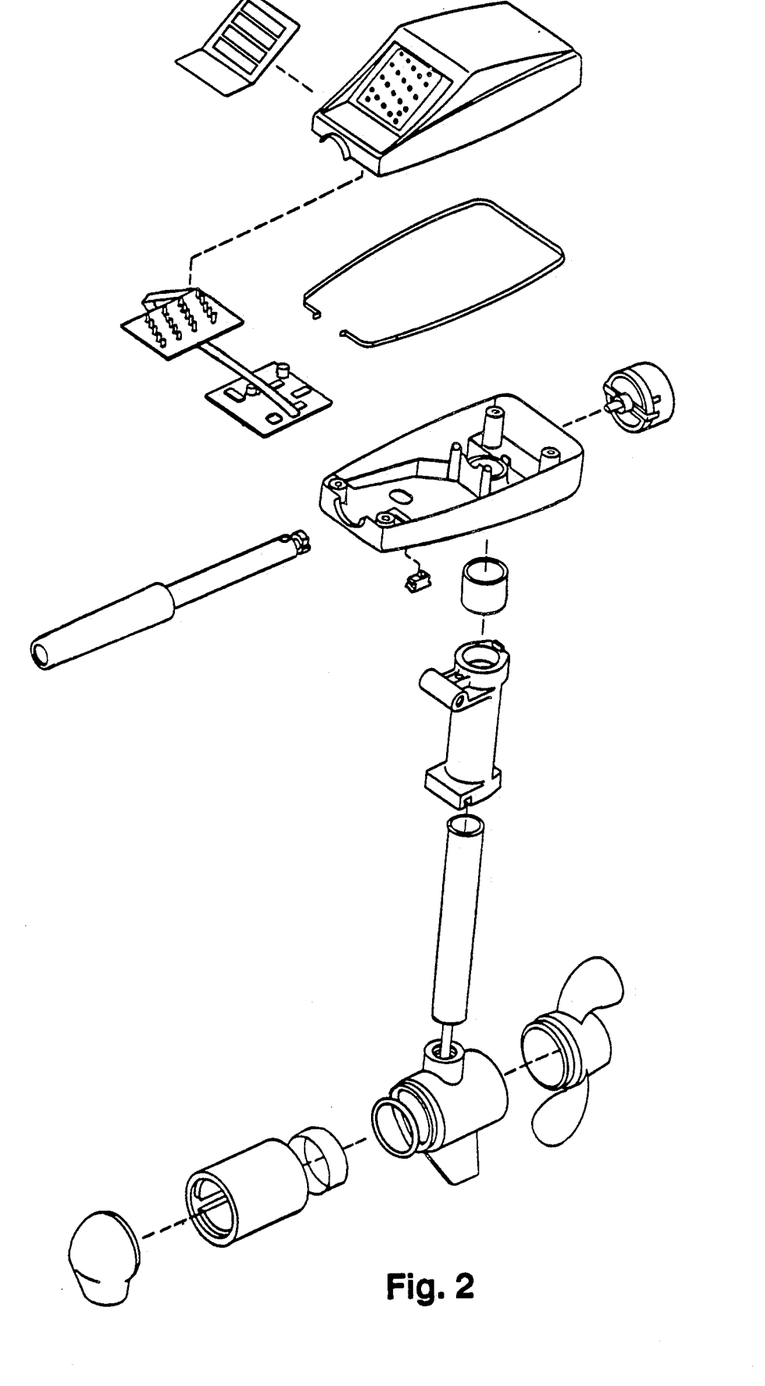
FIG. 2 is an exploded view of the depth finder-trolling motor.

Referring now to FIGS. 1 and 2, in accordance with one aspect of the invention, the dual function apparatus 10 includes a motor housing designated generally as 13, a support means 16, and a control box designated generally as 30. Housing 13 comprises a front end bell 12 in which a sonic transducer 16 is positioned, a center section 14 housing an electric motor (not shown), and a rear end bell 17. The motor housing 13 has a suitably streamlined shape so as to present a minimal amount of resistance to the water as the trolling motor travels through the water. A fin 15 depends longitudinally from the bottom side of the rear end bell 17 and aids in guiding and steering the boat. Motor housing 13 and fin 15 may be suitably constructed of a polymeric material or a die cast aluminum.

A marine propeller 18 is disposed at the rear end of housing 13. The propeller 18 is operatively connected to a propeller drive shaft (not shown) extending from the rear of the motor. The propeller provides propulsive thrust in a direction coaxial to the longitudinal axis of the motor. Propeller 18 may be suitably constructed of a polycarbonate resin such as Lexan commercially available from General Electric Co.

Front end bell 12 has a generally convex, elbow shape with a first opening 38 located approximately perpendicular to a second opening 40. Sides 36 and 37 of front end bell 12 are essentially parallel as are sides 29 and 39. Transducer 16 is superposed over opening 38. Transducer 16 is disposed in a molded plastic cap 19 which may snap fit into front end bell 12 and be sealed, e.g. by O-rings.

Front end bell 12 has an annular lip 41 forming opening 40. Annular lip 41 may be securably attached to the front end 42 of center section 14. A suitable seal, such a an O-ring is formed between front end bell 12 and housing center section 14 to prevent leakage of water into the housing.

Rear end bell 17 has an annular lip 44 which is securably attached to the back end 43 of center section 14 with a suitable seal, such as an O-ring, formed between rear end bell 17 and center section 14. Rear end bell 17 has an upwardly extending, annularly grooved tube-like portion 22 with an opening 33. Rear end bell 17 is suitably secured, for example, in threaded fashion, to lower end 35 of support means 16, as will be more fully explained below.

Support means 16 may comprise a hollow tube or shaft 20 which is rotatably secured in a sleeve 21 hinged to the boat in a conventional manner. Support shaft 20 extends through the sleeve 21 and the vertical elevation of the motor housing is adjusted by a stop collar (not shown) secured to the shaft 20. Shaft 20 may be conveniently about 27 in. to 54 in. (68.6 cm to 137.2 cm) long, preferably about 30 in. (76 cm) and have a diameter of about 1 in to 1½ in. (2.5 to 3.8 cm), preferably 1⅛ in (2.6 cm).

A shielded electrical cable 23 extends from transducer 16 through motor housing 13 and up through shaft tube 20 and electrically connects transducer 16 to an appropriate electric circuit board housed in control box 30, as will be explained below. The transducer may be suitably a barium titanate device manufactured by EDO Western, Salt Lake City, Utah and provides a beam width of about 18 degrees in the water.

Figure 3:
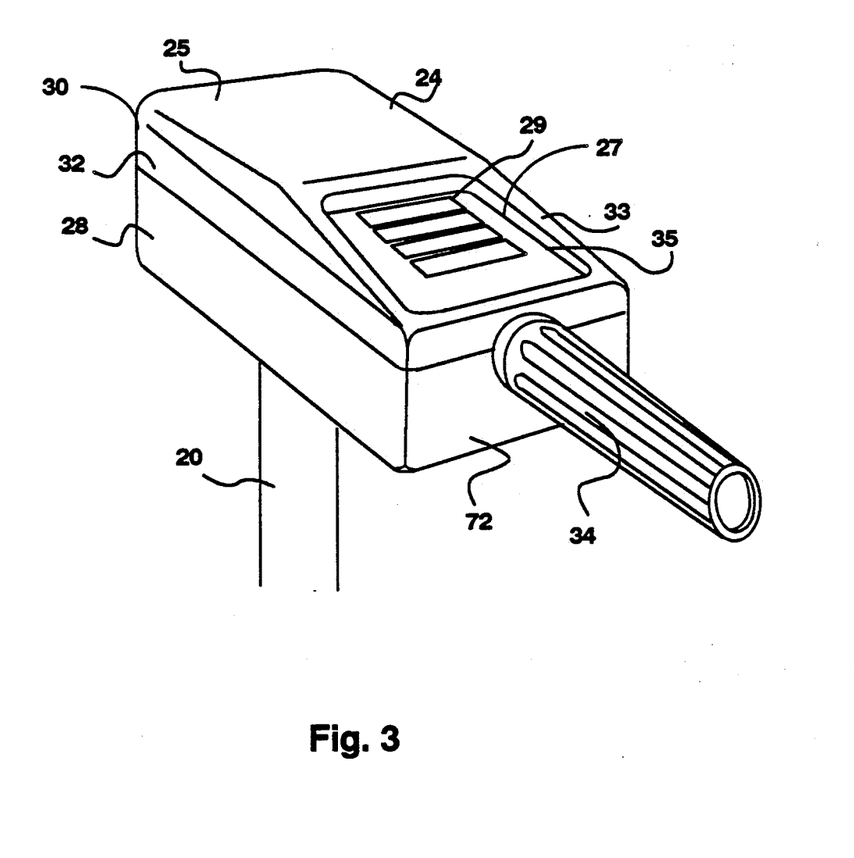
FIG. 3 is a perspective view of the control box of the depth finder-trolling motor showing the depth display.

As best seen in FIGS. 1 and 3, control box 30 may comprise a bottom 28, a top or cover 32 and a gasket 58 for sealing cover 32 to bottom 28. Bottom 28 has a generally parallelpiped shape and has a downwardly depending tube-like portion 26 with an aperture 27. Portion 26 has an inside diameter somewhat larger than the outside diameter of shaft 20.

Control box cover 32 has a generally parallelpiped shape with a top portion 25 comprising a generally horizontal element 24 and a downwardly sloping element 33. Sloping element 33 suitably has a generally rectangular opening or window 35 in which is positioned a visual display means 27, which will be described below.

Control box 30 conveniently houses circuit board 54 which contains the electrical circuitry for the depth finder and control board circuit 56 which contains the circuitry for display means 27. Cable 55 electrically connects board 54 and assembly 56. An electrical switch 50 turns the depth finder on and off.

A motor control means 31 includes a tiller or handle 34 and electrical control switch 52 for turning the motor on and off and varying the forward and reverse speeds of the motor. The directional orientation of the motor and motor housing may be controlled by rotating the shaft 20 about a substantially vertical axis. Such rotation is accomplished by rotating the tiller 24 clockwise or counterclockwise.

Figure 4:
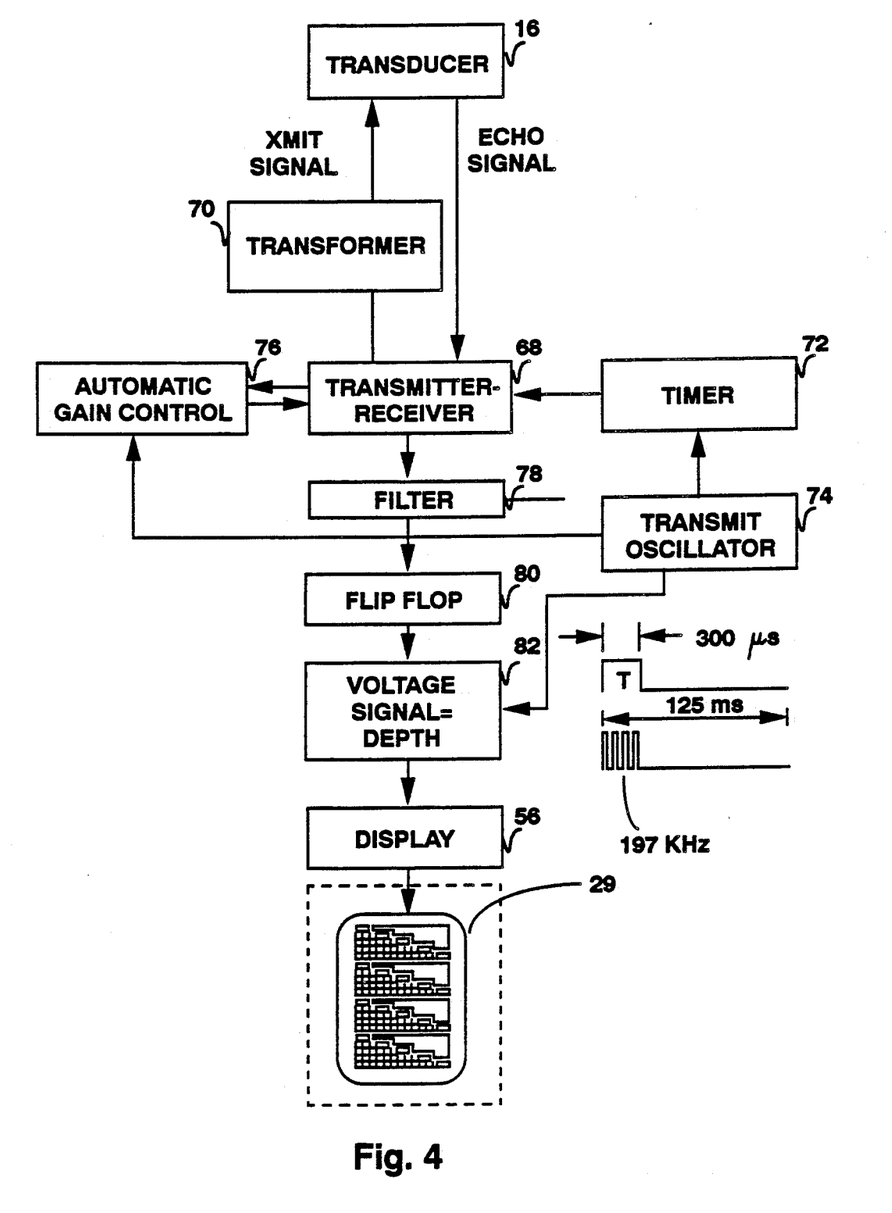
FIG. 4 is a block diagram of the circuitry employed in the depth finder according to the present invention.

Circuit board 54 suitably supports components which, in general, include a transmitting and receiving circuitry electrically connected to the sonic transducer by cable 23 as well as to an onboard battery, typically a 12-volt battery (not shown) by cables 62 and clips 64 and to control board assembly 56. Referring to FIG. 4, this circuitry is illustrated in block diagram form. A signal generator or oscillator 74, according to the illustrated embodiment, produces a transmit pulse having a duration of 300 microseconds and a cycle time of about 125 milliseconds. The 300 microsecond transmit pulse triggers a timer 72 prior to triggering a transmitter-receiver 68 to energize transducer 16 at a resonant frequency of 197 kHz via a step up transformer 70. The 300 microsecond transmit pulse also triggers a timer in the automatic gain control circuit 76, as will be explained below. The transducer 16 translates the electrical pulse developed by the electronic circuitry into sound waves of the frequency 197 kHz and receives echo sound waves or echo signal, reconverting the sound waves into electrical pulses and returning the thus reconverted sound waves to the circuitry. The filter 78 blocks out signals of insufficient length such as are returned by floating debris. Filter 78 provides a signal to flip flop 80 which in turn charges capacitor 82. The voltage charge on capacitor 82 corresponds to the depth and provides the depth display 27. At the beginning of each cycle, the transmit oscillator 74 resets the voltage on capacitor 82 to zero.

While the received echo sound wave may be developed as a voltage signal, it is also contemplated that other signals, such as time, may also be utilized.

Figure 5A:
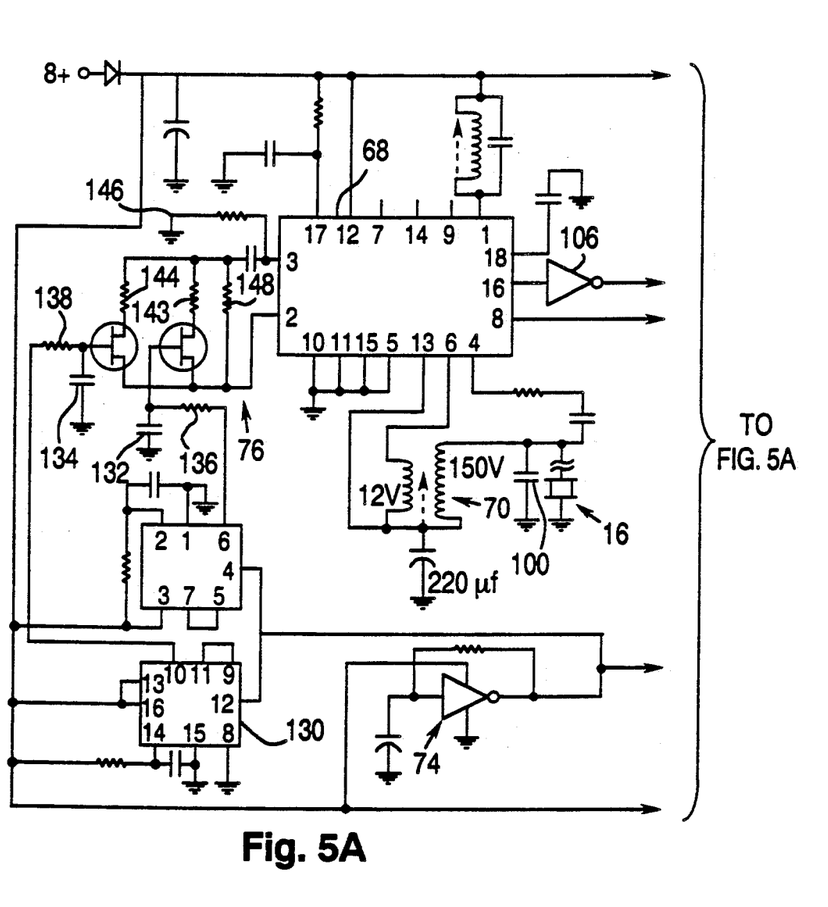
FIGS. 5a and 5b are a circuit diagram of the depth finder according to the present invention.
Figure 5B:
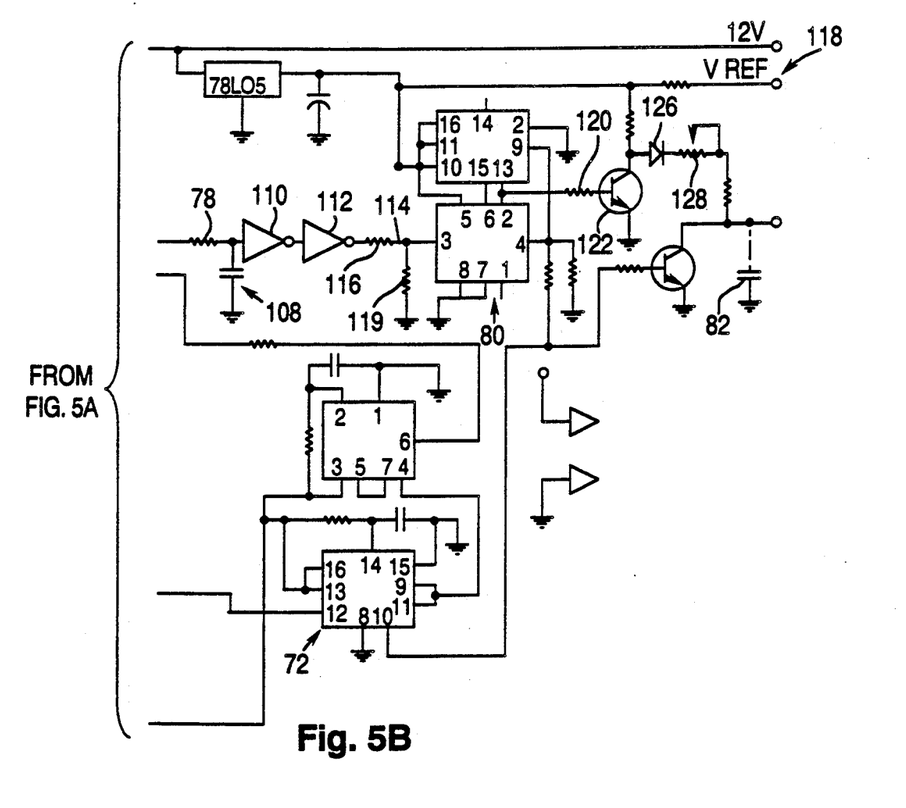

Turning now to FIGS. 5a and 5b, suitable circuitry of the depth finder which functions according to the present invention is illustrated in greater detail. Main transmit oscillator 74 suitably comprises a type CD40106 National integrated circuit device. The output of main oscillator 74 is applied to a transmit timer 72 suitably comprising a MM14538 National integrated circuit device. The transmit pulse is applied to pin 8 of transmitter-receiver 68 suitably comprising a type LM1812 National Linear integrated circuit device provided with a tuned circuit connected at pins 1 and 12 and tuned to 197 kHz. Pins 13 and 6 of the transmitter-receiver 68 are connected to the primary winding of step up transformer 70, the secondary of which is connected to the transducer 16. The step up of the transformer 70 is from 12 volts to 150 volts. One terminal of secondary winding is connected to the transducer 16, while the second terminal of the secondary and one terminal of the primary are coupled to a terminal of a capacitor 100 employed to store charge for operating the transducer via the step up transformer. The remaining terminal of capacitor 100 is grounded. The tap at the transducer 16 is connected through a capacitor 102 and a resistor 104 to pin 4 of transmitter-receiver 68. Pins 2 and 3 are connected to the automatic gain control 16, as will be explained below.

Pin 16 is connected to an inverter 106 which is connected to an RC filter 78. This filter 78 passes only signals which are present long enough to charge capacitor 108 to the trigger level of the next inverter 110. This output is then inverted again at inverter 112 and then reduced in voltage by a voltage divider 114 of two resistors 116 and 119. The reduced voltage is applied to pin 3 of a type CD4027 integrated circuit, a dual J-K flip-flop 80. Pins 7, 8, and 12 of the flip-flop 80 are grounded. Pins 5, 10, 11, and 16 are tied to the voltage reference 118. A positive trigger on pin 3 causes pin 2 to toggle, which is applied to pin 13. After the first echo is detected, pin 15 pulls pin 6 low which causes later echoes to be ignored until the next transmit cycle. The output of pin 2 is also applied to the base of a transistor 122 through a resistor 120. The emitter of the transistor 122 is tied to ground. The collector of transistor 122 is tied to the reference volt line through a resistor 124, and to the capacitor 82 through a diode 126 and variable resistor 128. The capacitor voltage represents the depth to be displayed. The other terminal of the capacitor 82 is tied to ground.

Figure 6:
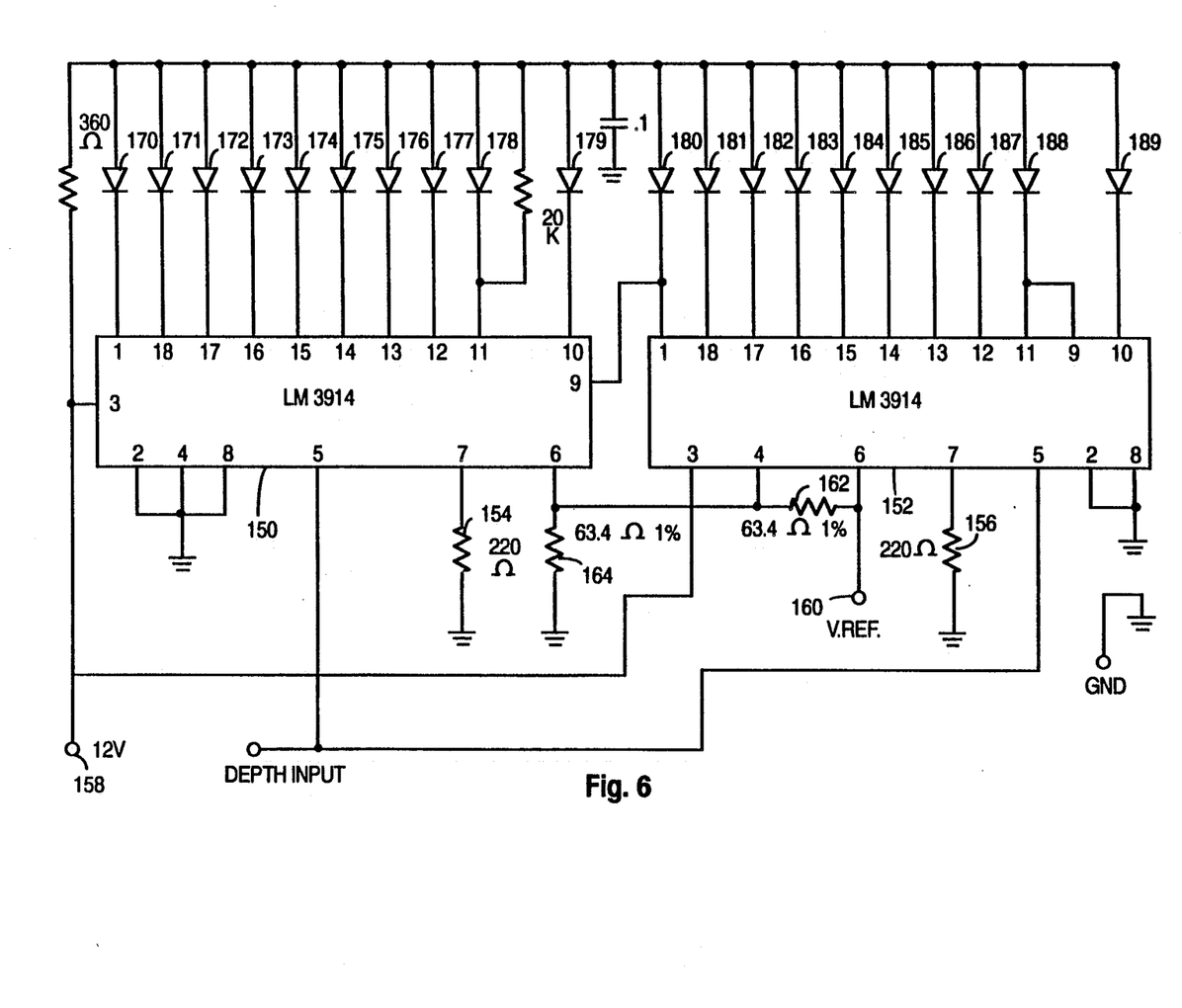
FIG. 6 is a circuit diagram of the depth finder display board according to the present invention.
Figure 7:
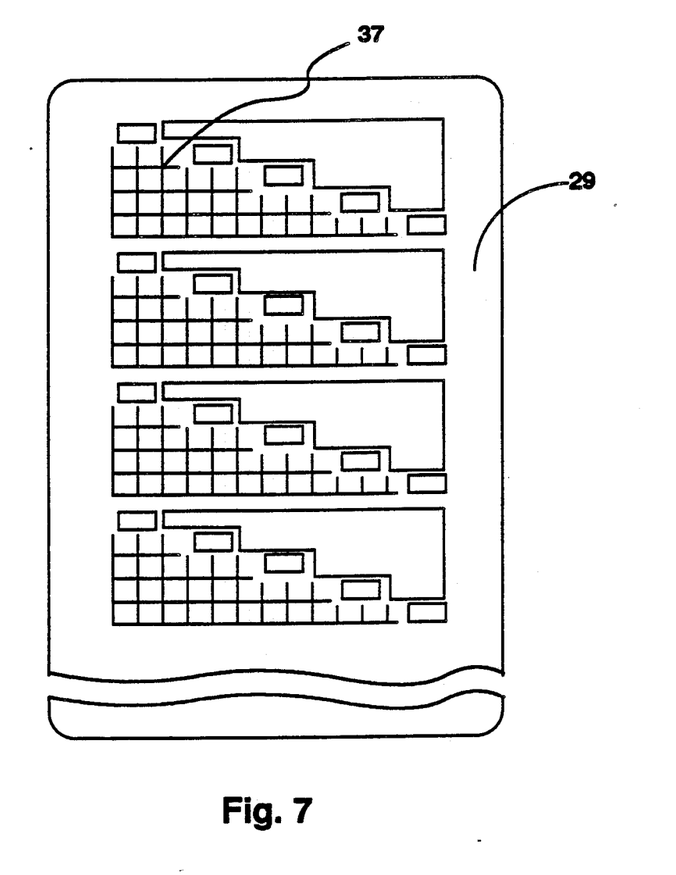
FIG. 7 is a front view of the display in accordance with the present invention.

As shown in FIGS. 6 and 7, in accordance with another aspect of the invention, display means 27 suitably includes the control box assembly board 56 and decal 29. Board 56 suitably includes at least one array of preferably five light emitting diodes (LEDs) in which the LEDs are arranged in rectilinear descent from left to right and spaced at regular intervals to illustrate the numbers from 2 to 10. Each successively descending LED represents 2 feet of water depth. Each array of five LEDs represents 10 ft of depth. Preferably, a control assembly board 56 has four arrays which visually represent depths of 2 to 40 ft. Current flow is sequentially produced at each LED as the LEDs are sequentially energized to illustrate the numbers from 2 through 10. A display remains visible until the next starting signal is emitted from the signal generator.

Decal 29 is suitably constructed of transparent polymeric film material. Decal 29 comprises display of a vertical and horizontal displacements 37 corresponding to depth typically in feet. Decal 29 is positioned in and affixed to window 35 of control box cover 32. Board 56 is positioned in control box 30 to align the LEDs of the board 56 with the corresponding stepwise displacements 37 of the decal 29, as best seen in FIG. 8. A primary advantage of the display means according to the present invention is that the LEDs provide high intensity light, making the indicator display easy to read and interpret even under adverse ambient light conditions. At the same time, the display means is reliable, lowcost, has a long life and low current consumption.

Now turning to the automatic gain control 76, its general operation is to automatically increase the gain of the amplifier in three discreet levels, from the minimum or base gain level of the amplifier. For various depths and types of lake bottoms, the minimum required gain circuitry is reset to the lowest gain after each display and is increased sequentially, with time, to allow for decreasing signal amplitude at deeper depths. As best shown in FIG. 5, the circuitry of the automatic gain control 76 includes a type MM14538 National integrated circuit device 130 which is triggered on pins 4 and 12 by the main oscillator 74. Outputs on pins 6 and 10 are pulses of a length set by the RC circuit for each timer. Each of the two outputs are applied to the gate of a type J174 National field effect transistor (FET) 140 and 142 and a capacitor 132 and 134 through a resistor 136 and 138. The other lead of each capacitor is tied to ground. The source lead of each FET is tied to pin 2 of the LM1812 transmitter-receiver 68. The drain lead of each FET is tied to a resistor 143 and 144 respectively. The other leads of the resistors 143 and 144 are tied together and connected through a capacitor 146 to pin 3 of the transmitter-receiver 68. Also across pins 2 and 3 through the capacitor 146 is a third resistor 148. Resistor 148 is always in circuit between pins 2 and 3 to produce minimum gain. The FET's parallel in the other resistors sequentially to increase the gain to a medium level, and then to maximum value.

The circuit for the display board assembly 56 generally includes 20 high intensity LED's 170-189 electrically connected to one or more integrated circuit driver devices which provide current for each LED in response to a variable voltage input. Referring to FIG. 6 of switch 150 input voltage corresponding to depth is applied to pin 5 of two switch circuits 150 and 152 suitably comprising a type LM3914 National Linear integrated circuits. Each integrated circuit is connected to 10 LEDs through pins 1, 18, 17, 16, 15, 14, 13, 12, 11 and 10. A tap at pin 1 of switch circuit 152 is connected to pin 9 of switch 150. Pins 2, 4, and 8 of switch 150 are grounded. Pins 7 of each switch circuit are grounded through a resistor 154 and 156, respectively and pins 3 are connected to battery 158. Voltage reference 160 is applied at pins 6 with a resistor 162 and tap to pin 4 at the tap to pin 6 of switch circuit 150. A tap at pin 6 is grounded across a resistor 164.

The pin numbers of the integrated circuit devices have been indicated in part where necessary to illustrate and describe the present circuit. Remaining pin connections and the like are quite standard and are understood by those skilled in the art. The circuit values where shown for individual components are illustrative of the particular embodiment.

Considering the overall construction and operation of the present invention, depth finding and trolling functions are conveniently accomplished in a single unit structure. A depth finder and trolling motor are disposed in a unitary structure whose dimensions are comparable to a conventional trolling motor. Simultaneous boat propulsion and water depth measurement are important features of the present invention, although each operation may be accomplished separately, if desired. The transducer of the depth finder function is conveniently positioned in the front end bell of the motor housing and requires no separate installation.

A further feature of the present invention is that the depth display indicator requires no separate unit. The distance to the reflecting object in the water is immediately displayed on a display decal through a window in the control box that is similarly dimensioned to the control box of a conventional trolling motor. The LED-illuminated display is visible in bright sunlight and easily read and interpreted from nearly any position in the boat.

Neither the display nor the transducer has a high power consumption requirement, according to one embodiment, drawing about 0.1 amperes. The dual function apparatus according to the present invention is substantially watertight and substantially resistant to corrosion by moisture.

Modifications of the present invention may be suggested to or made by those skilled in the art without departing from the scope of the invention expressed in the appended claims. While the invention has been described in combination with a trolling motor, it is also contemplated a depth finder in accordance with the present invention described herein may be housed in a unitary structure without an associated trolling motor.

What is claimed is:

1. A depth finding-trolling system, comprising:
   a motor housing;
   an electric propulsion motor disposed in said housing;
   a control box;
   means for operatively connecting said housing to said control box;
   means for steering and speed controlling said motor;
   a sonic transducer disposed in said motor housing;
   a main circuit electrically connected to said transducer for electrically developing a transmitted sonic signal and processing a received sonic echo signal into a signal corresponding to a depth distance;
   an electrical cable operatively connecting said transducer to said main circuit, said cable extending from said housing and through said support means to said control box;
   a gain control circuit operatively associated with said main circuit for automatically amplifying the sonic echo signal;
   a display board circuit operatively associated with said main circuit for translating said signal corresponding to a depth distance into visual information operatives; and
   a display including a plurality of light emitting diodes, said diodes being arranged in rectilinear descent from left to right to illustrate numbers in ascending order of a set of ten numbers, said display comprising four arrays of said diodes, each said array illustrating ten feet of depth.

2. A depth finding and trolling system, comprising:
   a trolling motor;
   a sonic transducer for transmitting and receiving sonic signals;
   circuit means electrically coupled to said transducer for electrically developing a transmitted sonic signal and processing a received sonic echo signal into a signal corresponding to a depth distance; and
   display means operatively associated with said circuit for translating said signal corresponding to a depth distance into visual information, said display means including a plurality of light emitting diodes, said diodes being arranged in rectilinear descent from left to right to illustrate numbers in ascending order of a set of ten numbers.

3. A depth finder, comprising:
   a sonic transducer for transmitting and receiving sonic signals;
   a main circuit electrically coupled to said transducer for electrically developing a transmitted sonic signal and processing a received sonic echo signal into a signal corresponding to a depth distance;
   a display board assembly operatively associated with said circuit for translating said signal corresponding to a depth distance into display drive signals; and
   a display responsive to said display drive signals for providing a visual display of said depth distance, said display including a plurality of light emitting diodes, said diodes being arranged in rectilinear descent from left to right to illustrate numbers in ascending order of a set of ten numbers.

4. The depth finder of claim 3, wherein said display comprises four arrays of said diodes, each said array illustrating ten feet in depth.

5. A depth finding and trolling system, comprising a unitary structure including
   a trolling motor, said trolling motor including a motor housing, a control box having a cover with a window, and means for operatively connecting said housing to said control box; and
   a depth finder, said depth finder including a sonic transducer for transmitting and receiving sonic signals disposed in said motor housing, circuit means for depth finding and for displaying visually depth measurements disposed in said control box, and display means disposed in said window of said cover of said control box for visually representing depth measurements.

6. The system of claim 5, wherein said motor housing includes an elbow-shaped front end bell and said sonic transducer is disposed within said elbow-shaped bell in a direction perpendicular to the longitudinal axis of said motor housing.

7. A depth finder display responsive to water depth indicative signals for indicating the depth of water, comprising an array of display elements, said display elements being vertically and horizontally displaced with respect to each other, said display elements comprising light emitting diodes, said diodes being arranged in rectilinear descent from left to right to illustrate numbers in ascending order of a set of ten numbers.

8. The display of claim 7, wherein said display comprises four of said arrays, each said array illustrating ten feet of water depth.

9. A method of manufacturing a depth finding-trolling system, comprising the steps of:
   disposing a sonic transducer for transmitting and receiving sonic signals and an electric propulsion motor in a housing having external dimensions approximately equal to a conventional trolling motor housing;
   disposing electric circuits for depth finding and displaying visually depth measurements in a control box having external dimensions approximately equal to a conventional trolling motor control box;
   securing said housing to said control box by means of a support shaft;
   securing a cover having a window to said control box;
   securing a display means for visually representing depth measurements in said window; and
   establishing an electrically conductive path between said transducer and said electrical circuits.

* * * * *